April 14, 1964     J. R. VAN GEUNS     3,129,081
DEVICE FOR FRACTIONATING GAS

Filed Feb. 3, 1960     3 Sheets-Sheet 1

INVENTOR
JOHANNES R. VAN GEUNS
BY
AGENT

April 14, 1964                J. R. VAN GEUNS                3,129,081
                          DEVICE FOR FRACTIONATING GAS
Filed Feb. 3, 1960                                         3 Sheets-Sheet 3

INVENTOR
J. R. VAN GEUNS
BY
AGENT

United States Patent Office 3,129,081
Patented Apr. 14, 1964

3,129,081
DEVICE FOR FRACTIONATING GAS
Johannes Rudolphus van Geuns, Eindhoven, Netherlands, assignor to North American Philips Company, Inc., New York, N.Y., a corporation of Delaware
Filed Feb. 3, 1960, Ser. No. 6,500
Claims priority, application Netherlands Mar. 17, 1959
5 Claims. (Cl. 62—37)

This invention relates to devices for fractionating gas, more particularly for obtaining liquid oxygen from air, by means of a gas-fractionating column which is connected to a cold-gas refrigerator, the outlet for the cold-gas mixture produced in the column leading to a heat-exchanger having a connection for compressed air to be fractionated, together with an outlet for this gas cooled by means of the said cold vapour, the last-mentioned outlet leading to the gas-fractionating column.

The term "cold-gas refrigerator" is to be understood herein to mean a refrigerator operating on the reverse hot-gas motor principle, which may be designed as a displacer piston engine, as a double-acting engine, as an engine the cylinders of which are at an angle to each other, or as an engine the working chamber of which is combined with that of a hot-gas motor.

An object of the invention is to provide a device for obtaining liquid oxygen, which delivers liquid oxygen of high purity at a comparatively low pressure, for example when air is supplied at a surpressure of the order of 2 to 9 atmospheres.

The novel device may be compact and built up in a simple manner and can operate permanently and fully automatically with a reasonable output for a considerable period of time.

A device according to the invention affords the important advantage that great freedom exists with regard to the choice of the ratio between the forward and backward flows in the heat-exchanger, in which the air supplied is cooled by the cold-gas mixture discharged from the column, before entering the fractionating column.

A device according to the invention is characterized in that the supply duct for the gas to be fractionated, before this gas enters the heat-exchanger, is provided with a branch duct including a regulating member, for example a cock, and leading to an area where impurities, such as carbonic acid and water, can be separated from the gas flowing through the said branch by means of the cold-gas refrigerator, prior to this gas being led to the gas-fractionating column after full or partial condensation thereof.

Consequently, a portion of the air supplied does not flow through the heat-exchanger, but impurities, such as water and carbonic acid, are separated therefrom by freezing out by means of the cold-gas refrigerator, whereupon the gas is condensed wholly or in part.

The operation of the heat-exchanger may thus be controlled in a simpler manner. The heat-exchanger may comprise two regenerators which are traversed alternately by the supplied air which is to be fractionated and cold-gas mixture from the column. As an alternative, recuperators may be used instead of regenerators.

In order that the invention may be readily carried into effect, four embodiments thereof will now be explained in detail, by way of example, with reference to the accompanying diagrammatic drawings.

Figure 1:
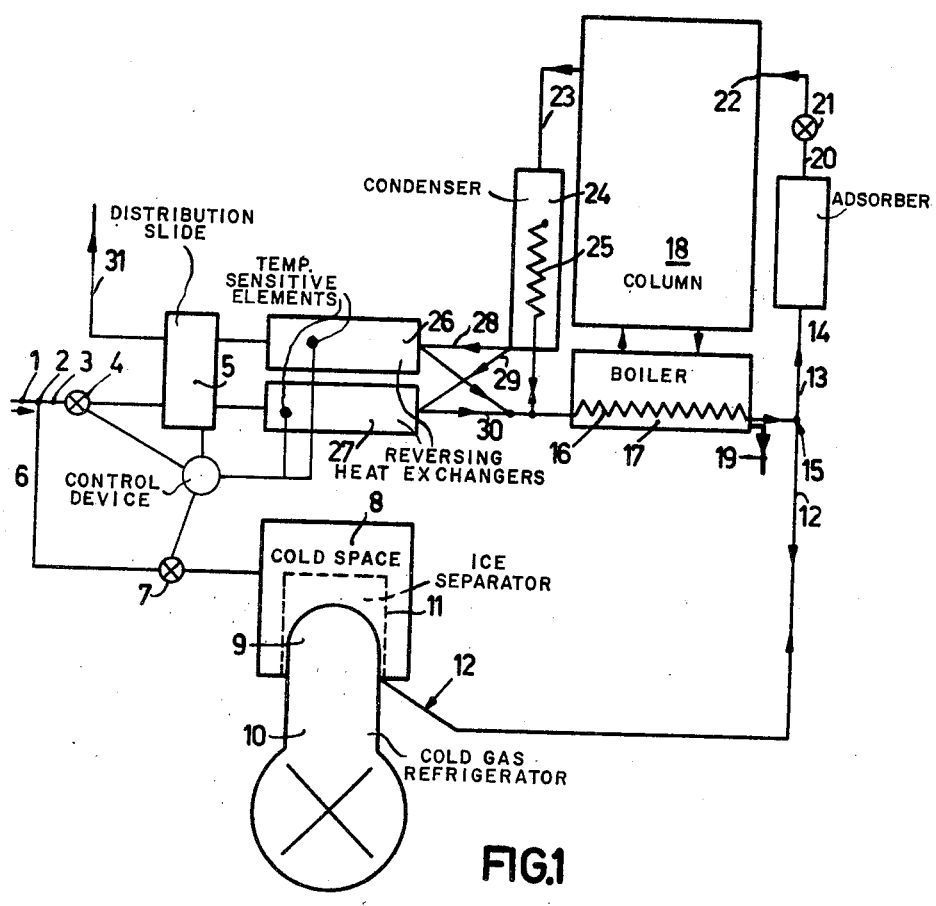
FIG. 1 is a diagrammatic view of the device for fractionating gas constructed in accordance with the present invention.

In FIG. 1, air compressed, for example, up to 4 atmospheres is supplied through a duct 1. The supply duct 1 is provided, at 2, with a main duct 3 which leads via a valve, for example a magnetic valve or shutter 4, to a distribution slide 5, and a branch duct 6 which leads via a shutter or cock 7 to a closed space 8 surrounding a condenser 9 of a cold-gas refrigerator 10. The space 8 which, together with the ducts connected thereto and any couplings therein, must in this example be designed to receive gas above atmospheric pressure, contains an ice separator 11, for example one or more cooled gauzes, on which the impurities in the gas supplied, such as water and carbon dioxide, deposit as ice. Inside the gauze 11, the gas flow is condensed wholly or in part on the condenser 9. The condensate is led through a duct 12 to a duct 13 which opens into an adsorber 14, for example on adsorber of the type known as a molecular sieve and filled with a substance which is active as an improved silica gel and which adsorbs the last traces of water and carbon dioxide and also acetylene.

The ducts 12 and 13 are connected at 15 to a condenser 16 in a boiling vessel 17 of a column 18. A tap for liquid oxygen is provided at 19.

An outlet 20 of the adsorber 14 leads along a choke cock 21 to an area 22 where condensed air is introduced into column 18.

The column 18, which in this example is shown as a so-called half column, may be packed with Raschig rings or a similar filling or be provided with plates. Cold-gas mixture ascending from column 18, which is poor in oxygen, consists of, for example, 90% of the amount of air supplied, which 90% is, for example, 80% of nitrogen and 10% of oxygen, the mixture being led through a duct 23 to an additional condenser 24 wherein the cold-gas mixture emerging from duct 23 has cold extracted from it by means of air in duct 25 to an extent such that the cold-gas mixture flowing from the additional condenser 24 to a regenerator 26 or 27 does not bring about cooling thereof to an extent such that air afterwards passed through this regenerator condenses therein. As a result of such condensation, the regenerator might get clogged.

Consequently, the air supplied is cooled in the regenerator to the condensation temperature. The cooled air then flows to condenser 16 in boiling vessel 17.

Ducts 28, 29 and 30, shown diagrammatically, which are provided with automatic valves, can alternately admit supplied air and the cold-gas mixture to, or permit discharge thereof from one of the regenerators 26 and 27. The outlet for the cold-gas mixture led from the column and through a regenerator 26 or 27, which gas mixture is thus enriched with nitrogen, is indicated by 31.

During operation, the slide 5 is changed-over so that, when a regenerator has been sufficiently cooled by the cold-gas mixture emerging from the column, the relevant regenerator can subsequently be traversed by supplied air to be fractionated. For this purpose the slide 5 is provided with suitable gates and inlet and outlet channels. The shutter 7 with accessories may then be adjusted so that approximately as much gas can be passed as corresponds to the amount of liquid gas tapped as pure oxygen at the lower side of the column, for example 10% of the amount of air supplied.

However, as an alternative, the shutter 7 may be adjusted to pass through it the full supply of gas during a fraction of the total time, this fraction approximately corresponding to the percentage of the gas tapped from the boiling vessel with respect to the total amount of gas.

It is to be noted that the cold-gas refrigerator 10 can also draw in gas through duct 12 from the condenser and hence from the main flow and condense this gas to compensate for insulation losses.

In practice, the cold-gas refrigerator is arranged beside the column 18, the duct 12 then sloping downwards from condenser 9 to the area 15.

The cock 7, the valve 4 and the slide 5 are automatically controlled during operation, for example by means of electronic control devices which respond to temperature-sensitive elements measuring temperatures in the regenerators 26 and 27. These control devices are also utilized in the structures shown in FIGS. 2, 3 and 4.

The cock 21 may be regulated as a function of the level in the condenser.

In this diagram, the cold-gas refrigerator operates at about 97° K., that is to say at a comparatively high temperature, which implies that the engine has a higher output than if this temperature were lower.

Figure 2:
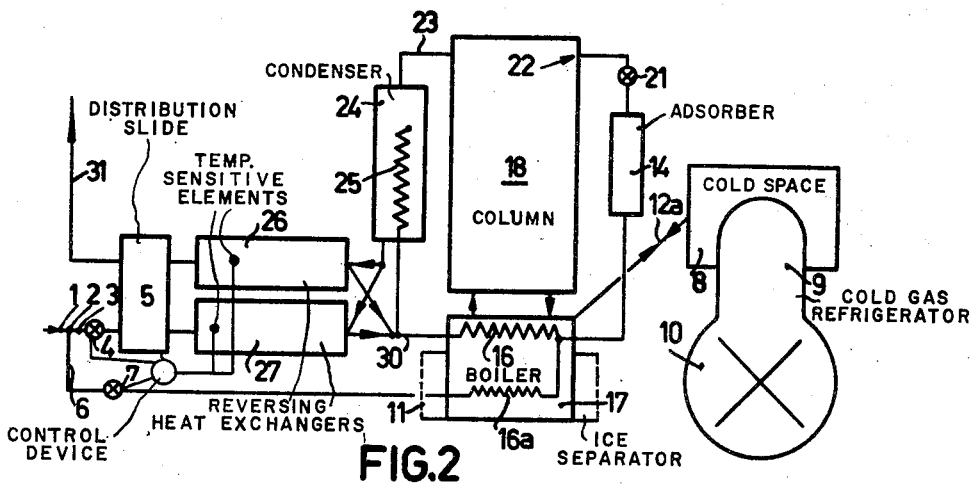
FIGS. 2 and 3 are diagrammatic views of alternate arrangements.

FIG. 2 shows an embodiment in which the air supplied to branch duct 6 is led to an ice separator 11, for example a cooled gauze, which in this case surrounds the boiling vessel 17.

Water and carbon dioxide are separated on this gauze, the air flowing through the ice on the gauze and through the gauze being led into a condenser 16a in the boiling vessel 17. In this embodiment, the cold-gas refrigerator 10 with a space 8 around condenser 9 is connected to a duct 12a which leads to the boiling vessel. In this case, the cold-gas refrigerator condenses oxygen.

The duct 12a and the coupling usually present therein need now not be resistant to gas under pressure.

Figure 3:
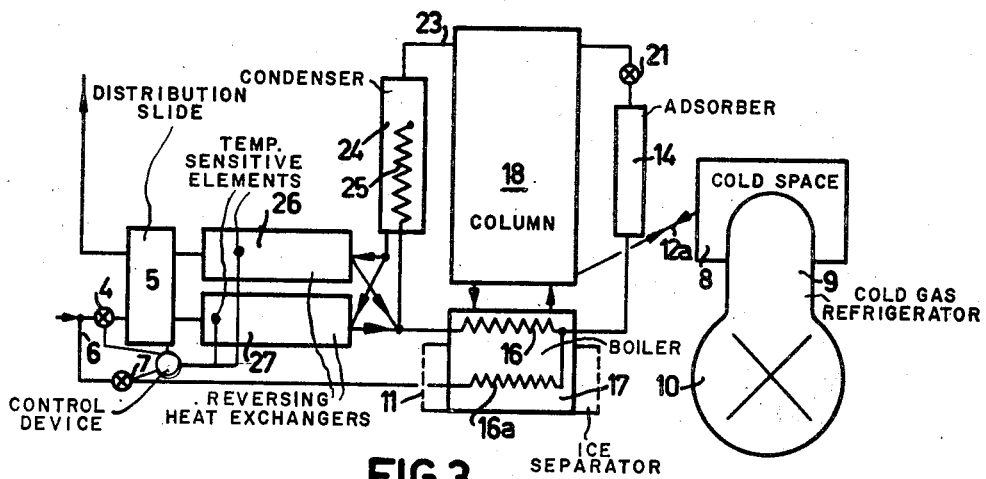

It may be seen from FIG. 3 that duct 12a may alternatively open into column 18, so that the condensate produced on the head of the cold-gas refrigerator then still delivers a little reflux into the column.

As an alternative, the column may be a so-called whole column or a double column.

Figure 4:
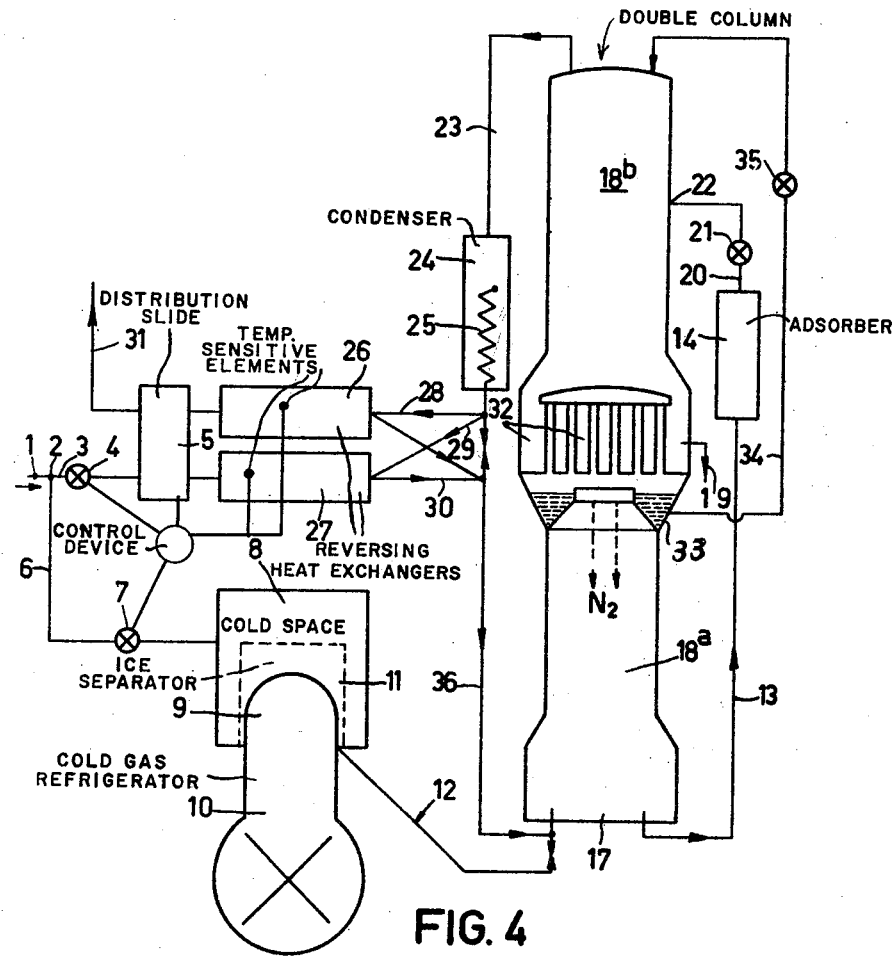
FIG. 4 is a diagrammatic view of a modified construction utilizing a double column.

FIG. 4 shows the diagram when use is made of a double column.

Such a column is constituted by a lower column 18a and an upper column 18b.

The lower portion of the lower column 18a constitutes a boiling vessel.

The upper portion of the lower column contains a condenser 32 having, for example, vertical pipes. Substantially pure nitrogen flows from condenser 32 downwards into the lower column 18a. A portion thereof which is collected in the annular space bounded by a wall 33 and the wall of the column flows through a duct 34 via a choking cock 35 to the upper column 18b.

Air emerging from the regenerator and the additional condenser 25 is led as gas through a duct 36 to the boiling vessel. This is supplemented with the gas and condensate emerging through duct 12 from the cold-gas refrigerator 10.

Liquid from the boiling vessel, which is rich in oxygen, passes through duct 13 to adsorber 14.

In the space around the pipes in condenser 32 there is collected pure liquid oxygen separated in the upper column 18b, which oxygen can be tapped at 19.

Otherwise, in all the diagrams shown, identical parts are indicated by the same reference numerals.

What is claimed is:

1. An apparatus for separating gas into fractions of which at least one of said fractions is gaseous nitrogen and another fraction is the product in a liquid state comprising a gas separation column having a boiler at the bottom thereof and an outlet near the top, a reversing heat exchanger outside of said column, a conduit means connecting said reversing heat exchanger to said column, an additional heat exchanger for warming said gaseous nitrogen coming through the outlet at the top of said column before said gaseous nitrogen enters said reversing heat exchanger and for supplying additional cold to said conduit means, said reversing heat exchanger and additional heat exchanger being connected in series with said column, a source of compressed gas of a pressure between 3–10 atmospheres and having a main duct therefor, said main duct being connected to said reversing heat exchanger, a branch duct being connected to said main duct at a location between said source of compressed air and the reversing heat exchanger and providing a path of compressed air flow to said column, a separate flow control member being arranged in both said main duct and said branch duct, a device for cleaning out impurities from the compressed air flow in said branch duct, said device being located in said branch duct and arranged in the path of the compressed air flow to said column, and a cold gas refrigerator being connected in said branch line for supplying cold to both said column and said cleaning device, the latter being a separator arranged on said cold gas refrigerator and being connected to said branch duct, said branch duct and flow control member therein being constructed to allow in said branch duct a mass flow corresponding substantially to the amount of liquefied gas-tapped as a product from the boiler of said column.

2. An apparatus for separating gas into fractions of which at least one of said fractions is gaseous nitrogen and another fraction is the product in a liquid state comprising a gas separation column having a boiler at the bottom thereof and an outlet near the top, a reversing heat exchanger outside of said column, a conduit means connecting said reversing heat exchanger to said column, an additional heat exchanger for warming said gaseous nitrogen coming through the outlet at the top of said column before said gaseous nitrogen enters said reversing heat exchanger and for supplying additional cold to said conduit means, said reversing heat exchanger and additional heat exchanger being connected in series with said column, a source of compressed gas of a pressure between 3–10 atmospheres and having a main duct therefor, said main duct being connected to said reversing heat exchanger, a branch duct being connected to said main duct at a location between said source of compressed air and the reversing heat exchanger and providing a path of compressed air flow to said column, a separate flow control member being arranged in both said main duct and said branch duct, a device for cleaning out impurities from the compressed air flow in said branch duct, said device being located in said branch duct and arranged in the path of the compressed air flow to said column, said device being an ice separator in said branch duct and surrounding said boiler, and a cold gas refrigerator provided with a condenser connected to the boiler of said column for supplying cold to said column.

3. An apparatus for separating gas into fractions as claimed in claim 2 wherein a space around the condenser of said cold gas refrigerator is connected to an area in said column which lies at a level higher than that of said boiler.

4. An apparatus for separating gas into fractions of which at least one of said fractions is gaseous nitrogen and another fraction is the product in a liquid state comprising a double separation column, said lower column having a boiler, an outlet at the top of the upper column, a reversing heat exchanger outside of said column, a conduit means connecting said reversing heat exchanger to said column, an additional heat exchanger for warming said gaseous nitrogen coming through the outlet at the top of said column before said gaseous nitrogen enters said reversing heat exchanger and for supplying additional cold to said conduit means, said reversing heat exchanger and additional heat exchanger being connected in series with said column, a source of compressed gas of a pressure between 3–10 atmospheres and having a main duct therefor, said main duct being connected to said reversing heat exchanger, a branch duct being connected to said main duct at a location between said source of compressed air and the reversing heat exchanger and providing a path of compressed air flow to said column, a separate flow control member being arranged in both said main duct and said branch duct, a device for cleaning out impurities from the compressed air flow in said branch duct, said device being located in said branch duct and arranged in the path of the compressed air flow to said column, a cold gas refrigerator being directly connected to said column for supplying cold to said column, said branch duct and flow control member therein being constructed to allow in said branch duct a mass flow corresponding substantially with the amount of liquefied gas tapped as a product from the boiler of said column, said branch duct being connected to the lower column of said double column, a further conduit for leading a portion of the condensate produced in the condenser of said lower column, and a choke cock for permitting said condensate to flow to said upper column.

5. An apparatus for separating gas into fractions as claimed in claim 1 further comprising a plurality of control devices, a plurality of temperature sensitive elements in said reversing heat exchanger connected to said control devices, said control member in said main duct being electrically connected to one of said control devices and automatically controllable thereby, said temperature sensitive elements being adapted to measure temperatures in said heat exchanger.

References Cited in the file of this patent

UNITED STATES PATENTS

| | | |
|---|---|---|
| 1,395,466 | Barbet | June 25, 1919 |
| 2,716,333 | Collins | Aug. 30, 1955 |
| 2,730,875 | Ranke | Jan. 17, 1956 |
| 2,764,877 | Kohler | Oct. 2, 1956 |
| 2,799,141 | Jonkers et al. | July 16, 1957 |
| 2,827,775 | Linde | Mar. 25, 1958 |
| 2,900,798 | Jonkers | Aug. 25, 1959 |
| 2,932,174 | Schilling | Apr. 12, 1960 |
| 3,066,494 | Potts | Dec. 4, 1962 |